United States Patent
Chang et al.

(10) Patent No.: US 8,072,194 B2
(45) Date of Patent: Dec. 6, 2011

(54) BOOST SNUBBER CIRCUIT STRUCTURE

(75) Inventors: Yu-Yuan Chang, Taipei Hsien (TW); Heng-Chia Chang, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 246 days.

(21) Appl. No.: 12/185,490

(22) Filed: Aug. 4, 2008

(65) Prior Publication Data

US 2010/0026274 A1    Feb. 4, 2010

(51) Int. Cl.
*G05F 1/56*    (2006.01)
*G05F 1/563*    (2006.01)
*G05F 1/565*    (2006.01)
*G05F 1/569*    (2006.01)
*G05F 1/575*    (2006.01)

(52) U.S. Cl. .................................. 323/222; 323/289

(58) Field of Classification Search .................. 323/222, 323/266, 282, 284, 288, 289; 361/91.7
See application file for complete search history.

(56) References Cited

U.S. PATENT DOCUMENTS

2007/0210772 A1*    9/2007    Sawtell .................... 323/282

* cited by examiner

*Primary Examiner* — Gary L Laxton
*Assistant Examiner* — Nusrat Quddus
(74) *Attorney, Agent, or Firm* — Muncy, Geissler, Olds & Lowe, PLLC

(57) ABSTRACT

A boost snubber circuit structure applied in a power supply having a boost circuit and a power conversion unit, wherein the boost circuit includes a boost unit connected to a switch element, a boost control unit for generating a driving signal to drive the switch element to control the charge/discharge of the boost unit, and a boost snubber unit for obtaining a voltage difference between a reference voltage and a detection signal and modulating the magnitude of the reference voltage or the detection signal to change the voltage difference and control the duration of outputting the driving signal. The voltage difference between the reference voltage and the detection signal determines the duration of outputting the driving signal. By controlling the voltage difference between the detection signal and the boost level, the invention prevents an occurrence of an inrush current caused by a too-large duration of generating the driving signal.

5 Claims, 4 Drawing Sheets

BOOST SNUBBER CIRCUIT STRUCTURE

FIELD OF THE INVENTION

The present invention relates to a boost snubber circuit structure, and more particularly to a boost circuit applied in a power supply for controlling the boost circuit to modulate the cycle of an input power.

BACKGROUND OF THE INVENTION

In FIG. 1, a conventional power supply (such as an AC/DC or DC/DC converter) generally includes a rectification unit 1, a boost circuit 2 (such as a conventional power factor correction unit with a boost function) and a switching power conversion unit 3, such that after an input power is passed through the rectification unit 1, and the voltage of the input power is modulated by the boost circuit 2 (such as a conventional power factor correction unit) to a predetermined boost level, and then the power conversion unit 3 converts the boosted input power into an output power, wherein the boost circuit 2 includes a boost unit 21, a switch element 22 and a boost control unit 23. The boost control unit 23 produces a driving signal for controlling an ON or OFF state of the switch element 22, and the ON or OFF state of the switch element 22 determines the charging and discharging cycles of the boost unit 21. The boost control unit 23 adjusts a duty ratio of the driving signal, which controls the ON duration of the driving signal for adjusting the ON time of the switch element 22 to control the voltage of the boost unit 21 and achieve the effect of modulating the boost voltage of the input power. After the power conversion unit 3 has obtained the input power, the boost control unit 23 of the boost circuit 2 adjusts the ON duration of the driving signal to its maximum in the same cycle to enter into the operating state, so that the boost unit 21 boosts to a predetermined voltage level (for example, a boost circuit of a general conventional power supply boosts the voltage over 380V) in the shortest time. In FIG. 2, the boost circuit 2 achieves the boost and modulation effects by continuous high frequency switching, and its operating principle is a prior art. However, the boost circuit 2 produces a large quantity of high frequency driving signals during the boost cycle, and thus the waveform shown in the figure only indicates the rise of an input power 91 and the change of duration of a driving signal 92. In the upper portion of FIG. 2, a voltage waveform of the input power 91 is shown. At the beginning, the voltage of the input power 91 is still different from a boost level 93, such that the driving signal 92 generated by the boost control unit 23 has a maximum ON duration width for modulating the input power to boost to the boost level in the shortest time, and the power supply enters into a standby state or a working state. Until the voltage of the input power 91 reaches the boost level 93, the ON duration of the driving signal 92 is reduced to a normal condition. If the boost control unit 23 uses the maximum ON duration to drive the boost unit 21 for charging, the boost unit 21 will produce a maximum inrush current, which will damage related circuits and components. The circuit will break down easily if high-voltage durable components are not used, but high-voltage durable components incur a high cost and require a larger volume, which are incompliance with the product trend for a low price and a compact size of electronic products. The issue of producing an inrush current when the boost circuit 2 boosts the voltage demands immediate attention and feasible solutions.

SUMMARY OF THE INVENTION

The primary objective of the present invention is to overcome the foregoing shortcomings of the prior art by providing a boost circuit structure for suppressing an inrush current, such that after a power supply obtains an input power, the boost circuit increases the cycle of the voltage to suppress the occurrence of the inrush current.

The present invention relates to a boost snubber circuit structure applied to a power supply having a boost circuit and a power conversion unit. The boost circuit obtains an input power to start a boost cycle. In the boost cycle, the boost circuit boosts the voltage of the input power to a boost level and then transmits the boosted input power to the power conversion unit to generate an output power. The boost circuit includes a boost unit, a boost control unit and a boost snubber unit, wherein the boost unit includes at least one energy storage element and obtains the input power, and the boost unit is connected to a switch element and the boost control unit generates a driving signal to drive the switch element to an ON state to control the charging and discharging of the boost unit. The duration of outputting the driving signal is determined by a voltage difference between a reference voltage and a detection signal, wherein the boost snubber unit obtains the voltage difference between the reference voltage and the detection signal from the boost unit and modulates the reference voltage or the detection signal to determine the voltage difference between the detection signal and the boost level, so as to control the duration of outputting the driving signal. With the foregoing circuit structure, the voltage difference between the detection signal and the boost level is controlled to prevent a too-large voltage difference between the detection signal and the boost level in order to prevent an inrush current caused by a too-large duration of generating driving signals by the boost control circuit. The present invention overcomes the shortcoming of producing an inrush current by the boost circuit in a boost cycle.

DETAILED DESCRIPTION OF THE PREFERRED EMBODIMENTS

Figure 1:
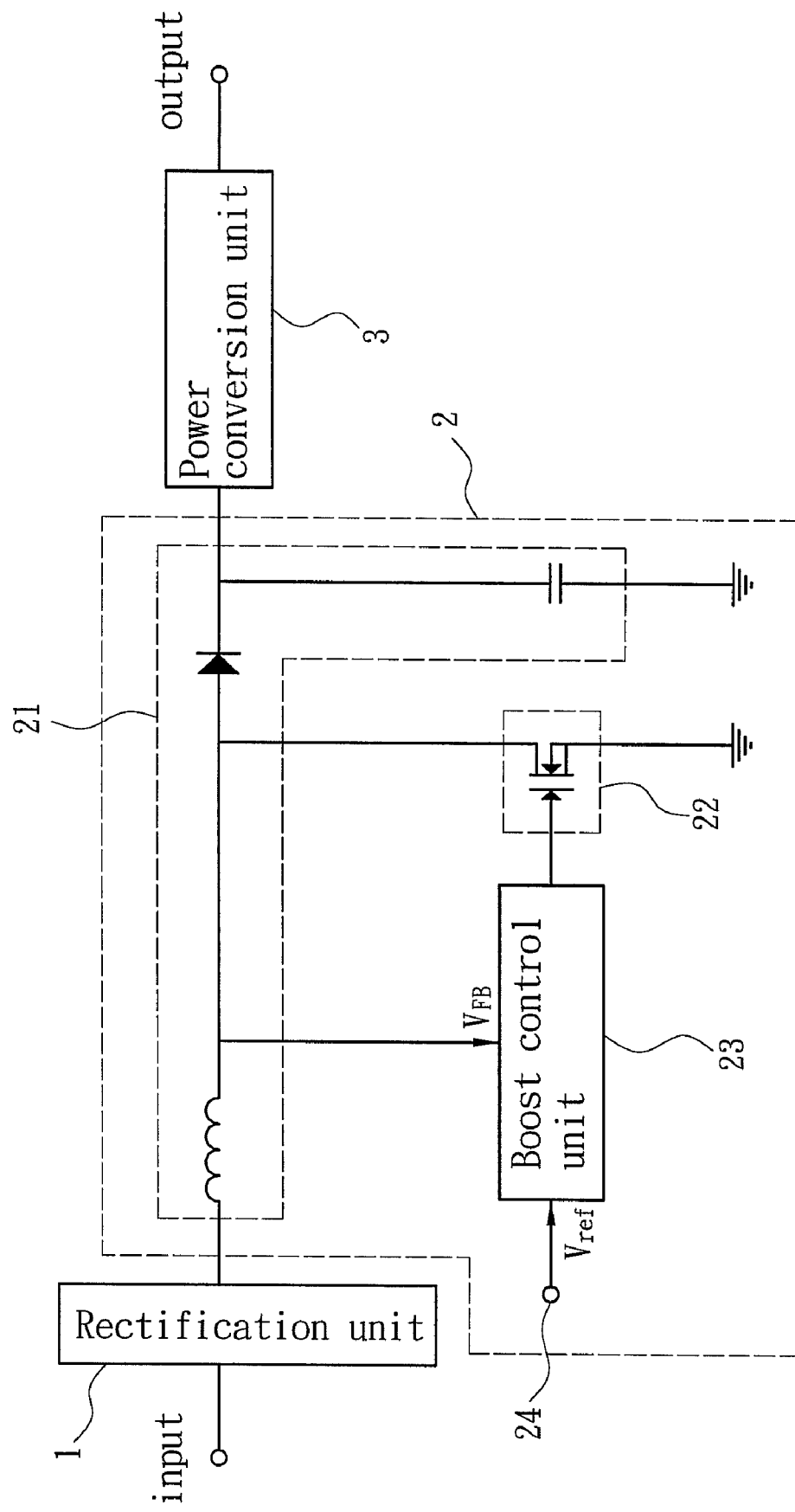
FIG. 1 is a schematic circuit diagram of a conventional boost circuit.
Figure 2:
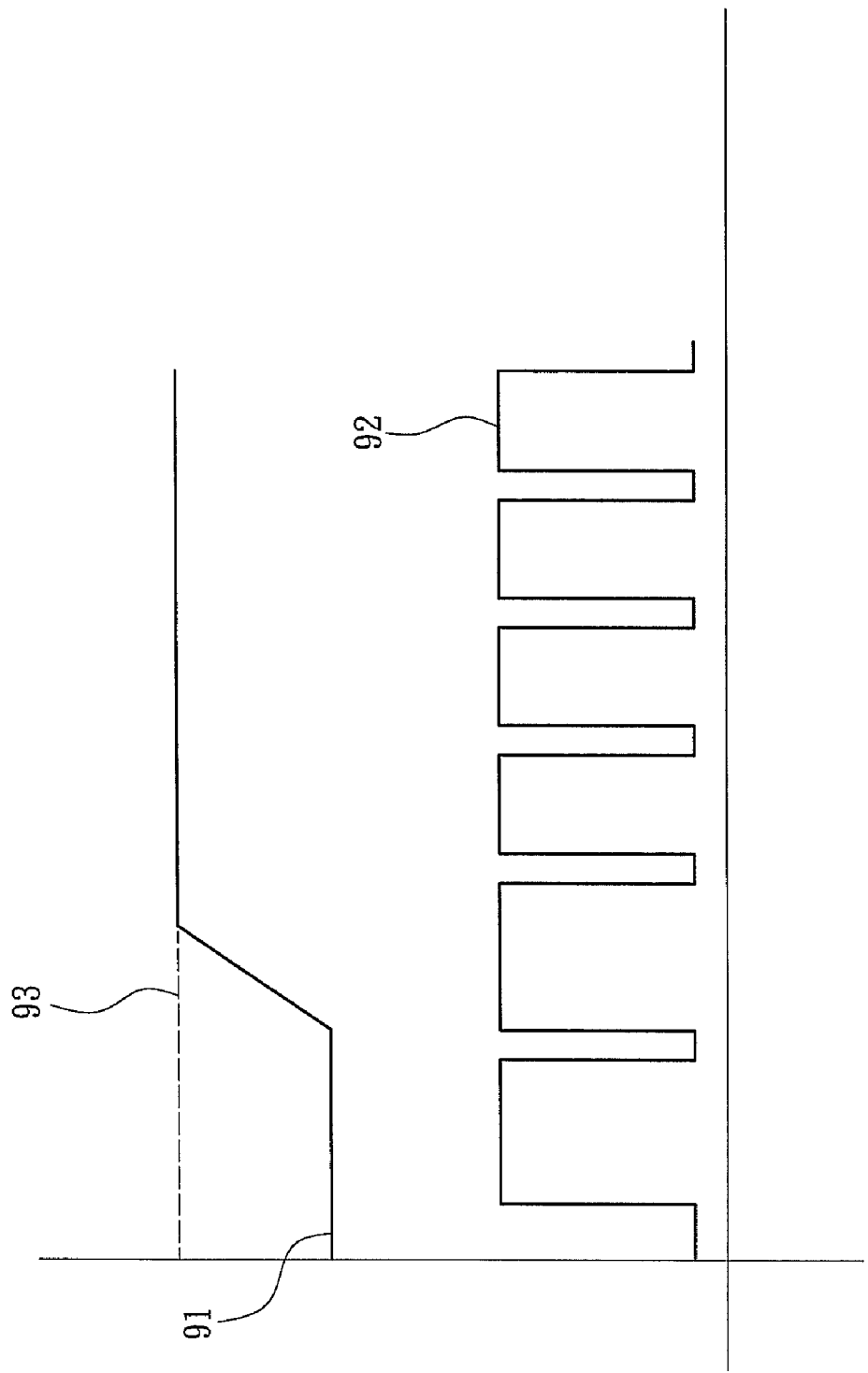
FIG. 2 is a waveform chart of an input power and a driving signal in accordance with a prior art.
Figure 3:
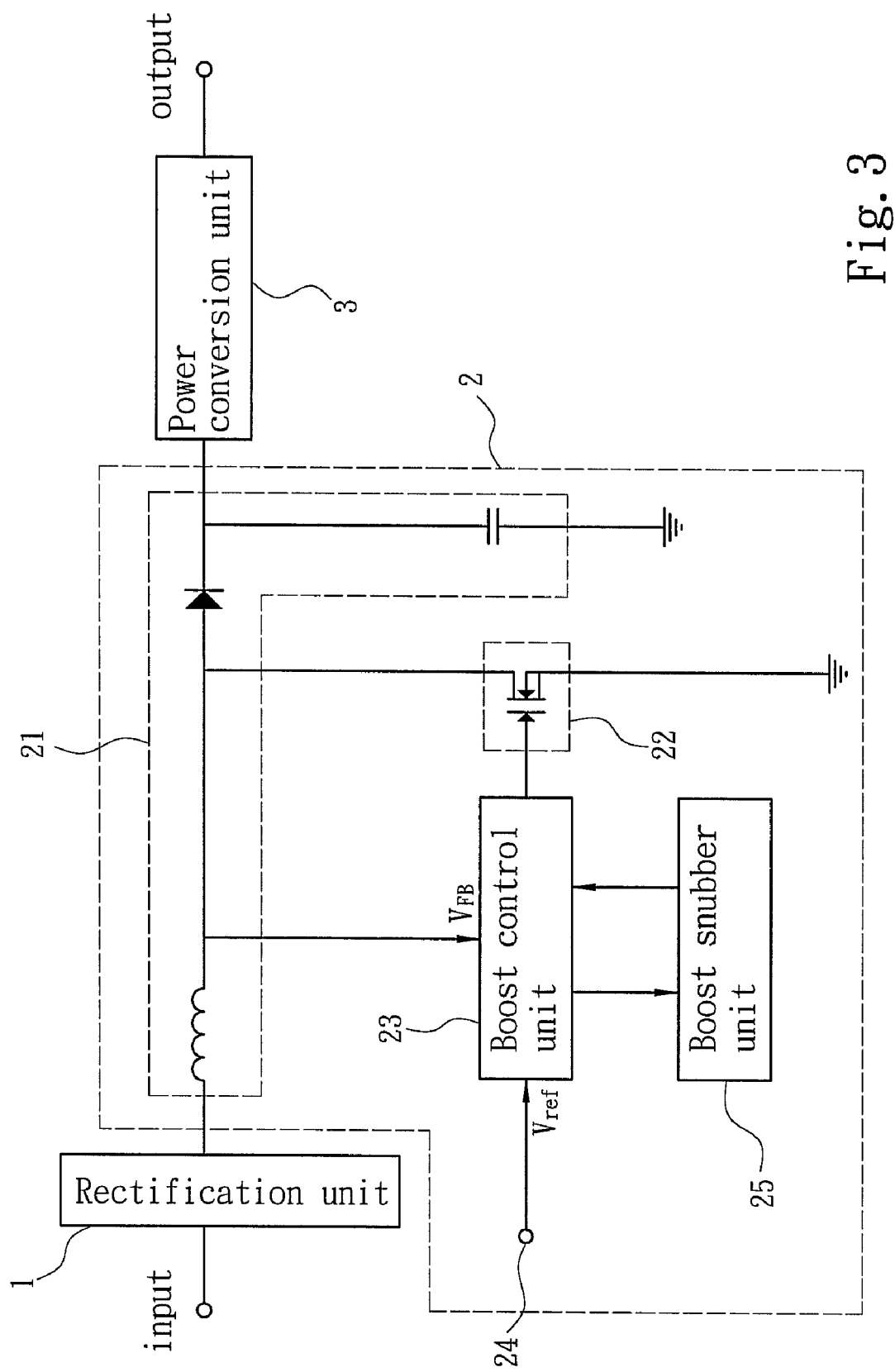
FIG. 3 is a schematic circuit diagram of the present invention.

With reference to FIG. 3 for a schematic circuit diagram of the present invention, the present invention is applied to a power supply having a boost circuit 2 and a power conversion unit 3, wherein the power supply obtains an input power, and after a rectification unit 1 transmits the input power to the boost circuit 2, and the boost circuit 2 obtains the input power, a boost cycle is started, and the boost circuit 2 boosts the input power to a boost level (generally 380V to 400V) during the boost cycle to enter the power supply into a normal working state or a standby state. After the boost circuit 2 boosts the voltage of the input power, the power conversion unit 3 at a rear end receives the input power at the boost level and converts the input power into an output power, wherein the boost circuit 2 includes a boost unit 21, a switch element 22, a boost control unit 23 and a boost snubber unit 25, and the boost unit 21 includes at least one energy storage element and obtains the input power, and the boost unit 21 is connected to the switch element 22, and the boost control unit 23 generates a driving signal to drive the switch element 22 to switch the input power through the cycle of the boost unit 21 for the boost and the energy storage of the boost unit 21, and the boost control unit 23 determines the boost level by a reference voltage ($V_{ref}$). By a voltage difference between a detection signal ($V_{FB}$) and the reference voltage, a duration of outputting the driving signal is determined, and the duration of outputting the driving signal is directly proportional to the voltage difference between the reference voltage and the detection signal, wherein the reference voltage is connected to a reference voltage source 24, and the detection signal is obtained from the boost unit 21. It is noteworthy to point out that the larger the difference between the reference voltage and the detection signal, the larger the duration of generating the driving signal is, and the easier the occurrence of the inrush current is. To suppress the inrush current produced by the electric power, the boost circuit 2 further comprises a boost snubber unit 25 for obtaining the reference voltage and the detection signal from the boost unit 21 and adds a modulation energy to modulate the magnitude of the reference voltage or the detection signal to determine the voltage difference between the detection signal and the reference voltage for controlling the duration of outputting the driving signal. If the boost circuit 2 obtains the input power, the boost snubber unit 25 modulates the magnitude of the reference voltage or the detection signal to reduce the voltage difference, such that the voltage difference between the detection signal and the boost level has a maximum voltage difference for correspondingly adjusting and adding the modulation power of the reference voltage or the detection signal to comply with the requirement of the maximum voltage difference between the detection signal and the boost level, and the voltage difference between the reference power and the detection signal has a floating value below the maximum voltage difference. If the voltage difference between the reference power and the detection signal reaches an upper limit, the boost snubber unit 25 can increase or decrease the modulation power to reduce the voltage difference between the reference power and the detection signal, so that the duration of generating the driving signal can be controlled within a specific range to suppress the production of inrush currents. The upper limit of modulating the reference voltage in the aforementioned modulation is the boost level for preventing a continuous rise of the voltage of the input power to exceed the boost level. In addition, the boost snubber unit 25 can modulate the magnitude of the reference voltage or the detection signal, so that the detection signal and the reference signal have a constant voltage difference, and the boost control unit 23 generates a driving signal with a constant duration. Similarly, the upper limit of modulating the reference voltage is the boost level to prevent the continuous rise of voltage of the input power from exceeding the boost level.

Figure 4:
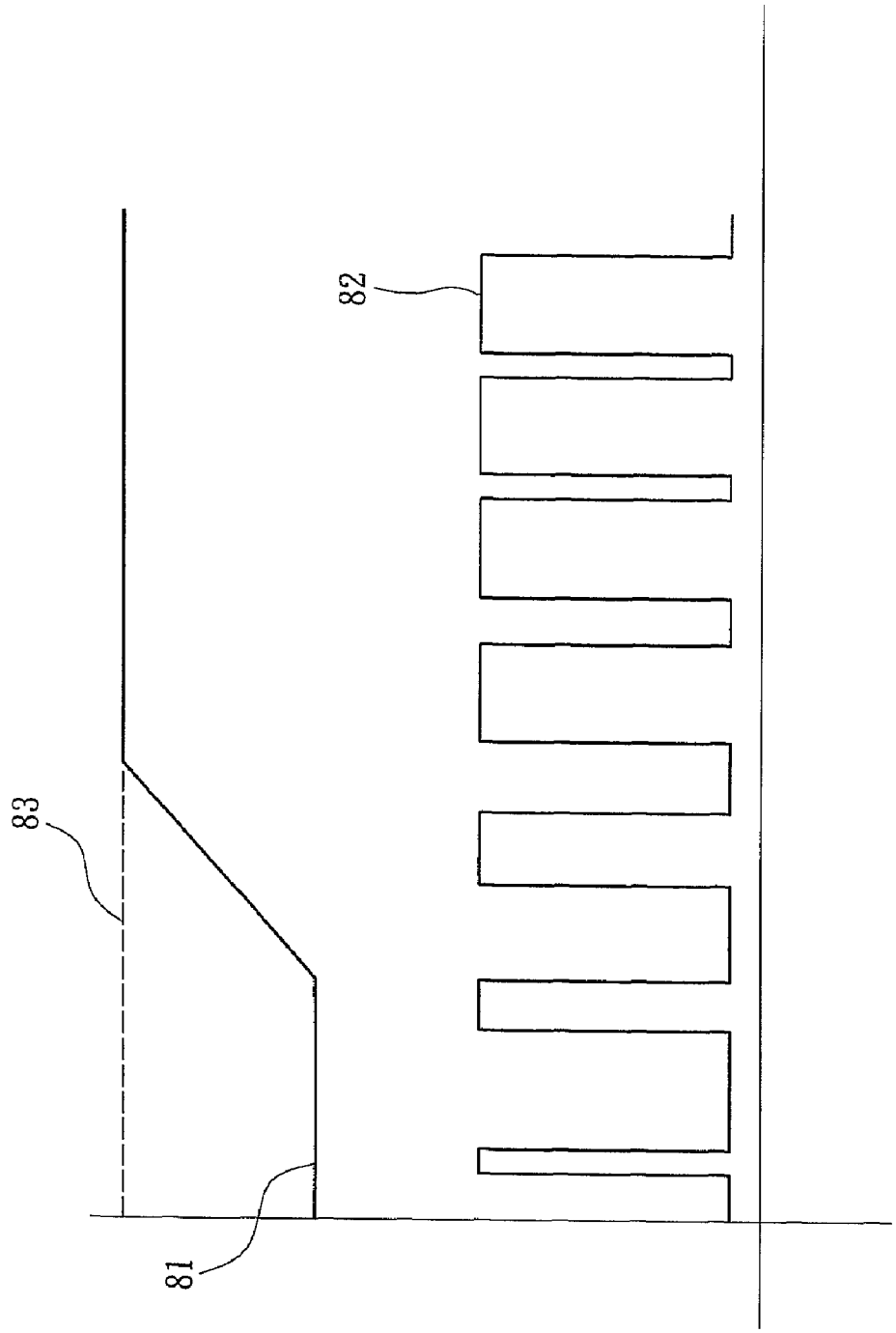
FIG. 4 is a waveform chart of an input power and a driving signal in accordance with the present invention.

With reference to FIG. 4 for a waveform chart of the input power and the driving signal in accordance with the present invention, the boost circuit 2 keeps switching at a high frequency to achieve the boost and modulation effect, and its operating principle is a prior art. However, the boost circuit 2 produces a large quantity of high frequency driving signals during the boost cycle, and thus the waveform shown in the figure only indicates the rise of the input power 81 and the change of duration of the driving signal 82, which is different from the actual waveform. In the FIG. 4, the input power 81 is boosted to a boost level, and since the boost control unit 23 controls the voltage difference between the detection signal and the reference signal, the duration of the driving signal 82 is increased gradually. The boost control unit 23 sets the voltage difference between the detection signal and the reference signal in a boost cycle to a maximum voltage difference to limit the speed of boosting the input power 81 to suppress the occurrence of inrush currents and release the limitation until the input power 81 reaches the boost level.

In the foregoing circuit structure, the boost control unit 23 achieves the effect of limiting the voltage difference of the detection signal and the reference signal, and the boost snubber unit 25 utilizes a charge/discharge circuit having at least one energy storage element and uses a back electromotive force (back EMF) as the modulation energy after the energy storage element receives the reference voltage or the detection signal, wherein the principle for the energy storage element to produce the back EMF is a prior art and thus will not be described here. The modulation energy formed by the energy storage element is provided for modulating the reference voltage or the detection signal into a waveform with the rise in a nonlinear curve to suppress the voltage difference between the detection signal and the reference voltage in the boost cycle.

In another embodiment, a differential amplification and compensation method is used, wherein the boost snubber unit 25 adopts at least one comparator and a voltage source controlled by the comparator, and the comparator determines the voltage difference between the detection signal and the reference signal, and the output from the comparator allows the voltage source to supply an electric power as the modulation energy to compensate the voltage difference between the detection signal and the reference signal. As described above, the method of implementing the boost snubber unit 25 should be understood easily to those ordinarily skilled in the art, and the present invention is not limited to the implementation of the circuit of the boost snubber unit 25.

While the invention has been described by means of specific embodiments, numerous modifications and variations could be made thereto by those skilled in the art without departing from the scope and spirit of the invention set forth in the claims.

In summation of the description above, the present invention improves the aforementioned effects of the prior art, and complies with the requirements of patent application, and thus is duly filed for patent application.

What is claimed is:

1. A boost snubber circuit structure, applied to a power supply having a boost circuit for obtaining an input power to modulate to a boost level and a power conversion unit for converting the input power at a boost level into an output power, and the boost circuit comprising:

a boost unit, having at least one energy storage element, for obtaining the input power, and the boost unit being coupled to a switch element;

a boost control unit, for generating a driving signal to drive the switch element to an ON state, and using a voltage difference between a reference voltage and a detection signal to determine a duration of outputting the driving signal; and a boost snubber unit, for obtaining the voltage difference between the detection signal and the reference voltage from the boost unit, and adding a modulation voltage to the reference voltage or the detection signal to modulate the voltage difference between the detection signal and the reference voltage, so as to control the duration of outputting the driving signal, the detection signal and the boost level having a maximum voltage difference to determine a continuous rise of the voltage of the input power to exceed the boost level and providing the modulation voltage to compensate the reference voltage or the detection signal to control the voltage difference smaller than the maximum voltage difference.

2. The boost snubber circuit structure of claim 1, wherein the reference voltage has a maximum modulation value equal to the boost level.

3. A boost snubber circuit structure, applied to a power supply having a boost circuit for obtaining an input power to modulate to a boost level and a power conversion unit for converting the input power at a boost level into an output power, and the boost circuit comprising:
- a boost unit, having at least one energy storage element, for obtaining the input power, and the boost unit being coupled to a switch element;
- a boost control unit, for generating a driving signal to drive the switch element to an ON state, and using a voltage difference between a reference voltage and a detection signal to determine a duration of outputting the driving signal; and
- a boost snubber unit, for obtaining the voltage difference between the detection signal and the reference voltage from the boost unit, and adding a modulation voltage the reference voltage or the detection signal to modulate the voltage difference between the detection signal and the reference voltage, so as to control the duration of outputting the driving signal,
- the detection signal and the reference signal having a constant voltage difference over time.

4. The boost snubber circuit structure of claim 3, wherein the reference voltage has a maximum modulation value equal to the boost level.

5. The boost snubber circuit structure of claim 1, wherein the boost snubber unit includes a charge/discharge circuit, such that the reference voltage or the detection signal is passed through the charge/discharge circuit to modulate into a waveform with the rise in a nonlinear curve, so as to suppress the voltage difference between the detection signal and the reference voltage in the boost cycle.

* * * * *